(12) United States Patent
Herkenrath et al.

(10) Patent No.: US 7,628,453 B2
(45) Date of Patent: Dec. 8, 2009

(54) VEHICLE SEAT

(75) Inventors: Guido Herkenrath, Wuppertal (DE);
Jörg Haubrich, Leverkusen (DE);
Marcus Thies, Gevelsberg (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 12/067,496

(22) PCT Filed: May 18, 2006

(86) PCT No.: PCT/EP2006/004703

§ 371 (c)(1),
(2), (4) Date: Mar. 20, 2008

(87) PCT Pub. No.: WO2007/033708

PCT Pub. Date: Mar. 29, 2007

(65) Prior Publication Data

US 2008/0224511 A1 Sep. 18, 2008

(30) Foreign Application Priority Data

Sep. 21, 2005 (DE) .................. 10 2005 045 207

(51) Int. Cl.
*A47C 7/14* (2006.01)

(52) U.S. Cl. .................. 297/284.9; 297/284.1

(58) Field of Classification Search ............. 297/284.9, 297/115, 116, 117, 284.1
See application file for complete search history.

(56) References Cited

U.S. PATENT DOCUMENTS

| | | | | |
|---|---|---|---|---|
| 1,802,620 A | * | 4/1931 | Scully | 297/113 |
| 2,584,481 A | * | 2/1952 | Mast et al. | 297/115 |
| 2,646,107 A | * | 7/1953 | Murphy | 297/113 |
| 2,771,123 A | * | 11/1956 | Freeman | 297/115 |
| 3,168,346 A | * | 2/1965 | Rei, Jr. | 297/113 |
| 3,191,995 A | * | 6/1965 | Shelton | 297/115 X |
| 4,159,145 A | * | 6/1979 | Quakenbush | 297/113 |
| 5,290,092 A | * | 3/1994 | Geer | 297/115 X |
| 5,294,182 A | * | 3/1994 | Colasanti | 297/115 X |
| 5,297,839 A | * | 3/1994 | Fukushima | 297/117 X |
| 2004/0124687 A1 | * | 7/2004 | Nae et al. | 297/115 |
| 2006/0267382 A1 | * | 11/2006 | McMillen et al. | 297/115 |
| 2008/0191533 A1 | * | 8/2008 | Poniatowski | 297/284.9 |

FOREIGN PATENT DOCUMENTS

| | | |
|---|---|---|
| DE | 31 29 525 A1 | 7/1981 |
| DE | 102 35 885 B3 | 4/2004 |
| DE | 10 2004 014 420 A1 | 10/2005 |
| DE | 10 2005 045 207 A1 | 3/2007 |
| EP | 0 972 672 A | 1/2000 |
| FR | 1 570 592 A | 6/1969 |

(Continued)

*Primary Examiner*—Rodney B White
(74) *Attorney, Agent, or Firm*—Foley & Lardner LLP

(57) ABSTRACT

A vehicle seat, in particular a rear seat bench for a motor vehicle, has a seat part and a backrest which is provided with displaceable side cushions. Their position can be changed as a function of the position of the backrest. According to the invention, at least the backrest is arranged in the vehicle in a manner such that it can be displaced in or counter to the direction of travel, wherein the position of the side cushions located on the outside of the backrest can be forcibly changed as a function of the sliding position of the backrest.

10 Claims, 3 Drawing Sheets

Figure 1:
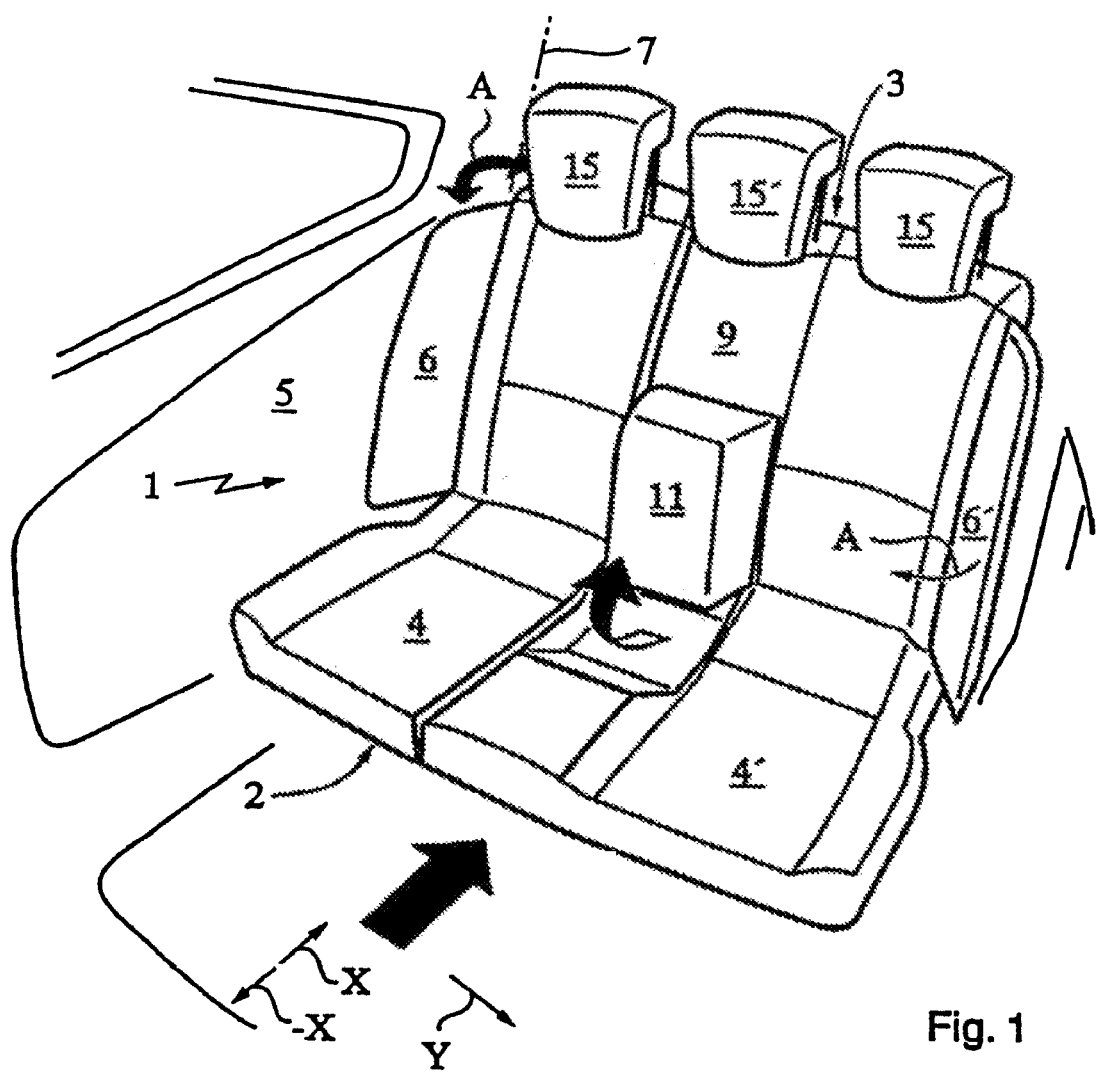

| | FOREIGN PATENT DOCUMENTS | | | WO | WO 03/095263 A | 11/2003 |
|----|----|----|----|----|----|----|
| FR | 2 828 147 A | | 2/2003 | WO | WO 2004/043207 A2 | 5/2004 |
| JP | 62 168738 A | | 7/1987 | | | |
| JP | 03118243 A * | 5/1991 | ................. 297/115 | * cited by examiner | | |

VEHICLE SEAT

The present application is a United States National Stage of International Patent application No. PCT/EP2006/004703, filed on May 18, 2006, which claims the benefit of (Paris Convention priority) German Patent Application No. 102005045207.8, filed on Sep. 21, 2005. The entire disclosures of International Application No. PCT/EP2006/004703 and German Patent Application No. 102005045207.8 are incorporated herein by reference.

DESCRIPTION

The invention relates to a vehicle seat, in particular a rear seat bench for a motor vehicle, comprising a seat part and a backrest, which is provided with displaceable side cushions, the position of which can be varied as a function of the position of the backrest.

STATE OF THE ART

A vehicle seat of generic type is disclosed by WO 2004/043207 A2. The backrest of this seat is provided with contoured inserts, which cause the side cushions of the backrest to swivel as a function of their turned position. With the backrest in an upright position of use, the side cushions are shifted forward to produce an especially comfortable support contour for the occupants of the seat. When the backrest is folded forward onto the seat part (loading position) on the other hand, the side cushions are swiveled rearward until the backrest forms a virtually plane support face. This enables the assembly comprising the seat part and the backrest folded forward to be kept especially compact.

OBJECT OF THE INVENTION

The object of the invention is to further develop the vehicle seat of generic type in such a way that the position of the seat occupants can be influenced particularly in the transverse direction (Y-direction) of the vehicle.

SUMMARY OF THE INVENTION

According to the invention the object is achieved in that at least the backrest is arranged in the vehicle so that it is displaceable in or counter to the direction of travel and the position of the side cushions located on the outside of the backrest can be positively varied as a function of the sliding position of the backrest. By shifting the side cushions, the seating position of the occupants in the transverse direction of the seat is influenced without the seat as a whole being displaced in a transverse direction.

The seat part is preferably displaceable together with the backrest, so that the alignment of the side cushions varies as a function of the sliding position of the vehicle seat. The vehicle seat can here advantageously be embodied as a seat bench divided in the transverse direction (Y-direction), the outer segments of the seat bench being provided with displaceable side cushions on their outer side.

According to a first development of the invention the side cushions are capable of swiveling about a vertical axis of the backrest, that is to say about a vertical axis when the backrest is in an upright position of use. Alternatively or in addition, at least the lower part of the side cushions may be rotatable about a transverse axis of the backrest.

It is of particular advantage if, with the backrest in a forward sliding position, the side cushions are swiveled into a position running in the plane of the back support face. In this case, for example, a rear seat bench affords space for three occupants. The side cushions are, in particular, swiveled into their rear position under spring force.

With the backrest in a rear sliding position, on the other hand, the side cushions are swiveled forwards into a support face-contouring position projecting forwards from the back support face, which shifts the seating position of now just two occupants towards the middle in the transverse direction (Y-direction) of the vehicle. This now provides the occupants with an especially comfortable vehicle seat. Swiveling of the side cushions into their forward position preferably ensues due to contact with an actuator fixed to the vehicle body.

DRAWINGS

The drawings are schematic representations of different exemplary embodiments of the invention.

Figure 2:
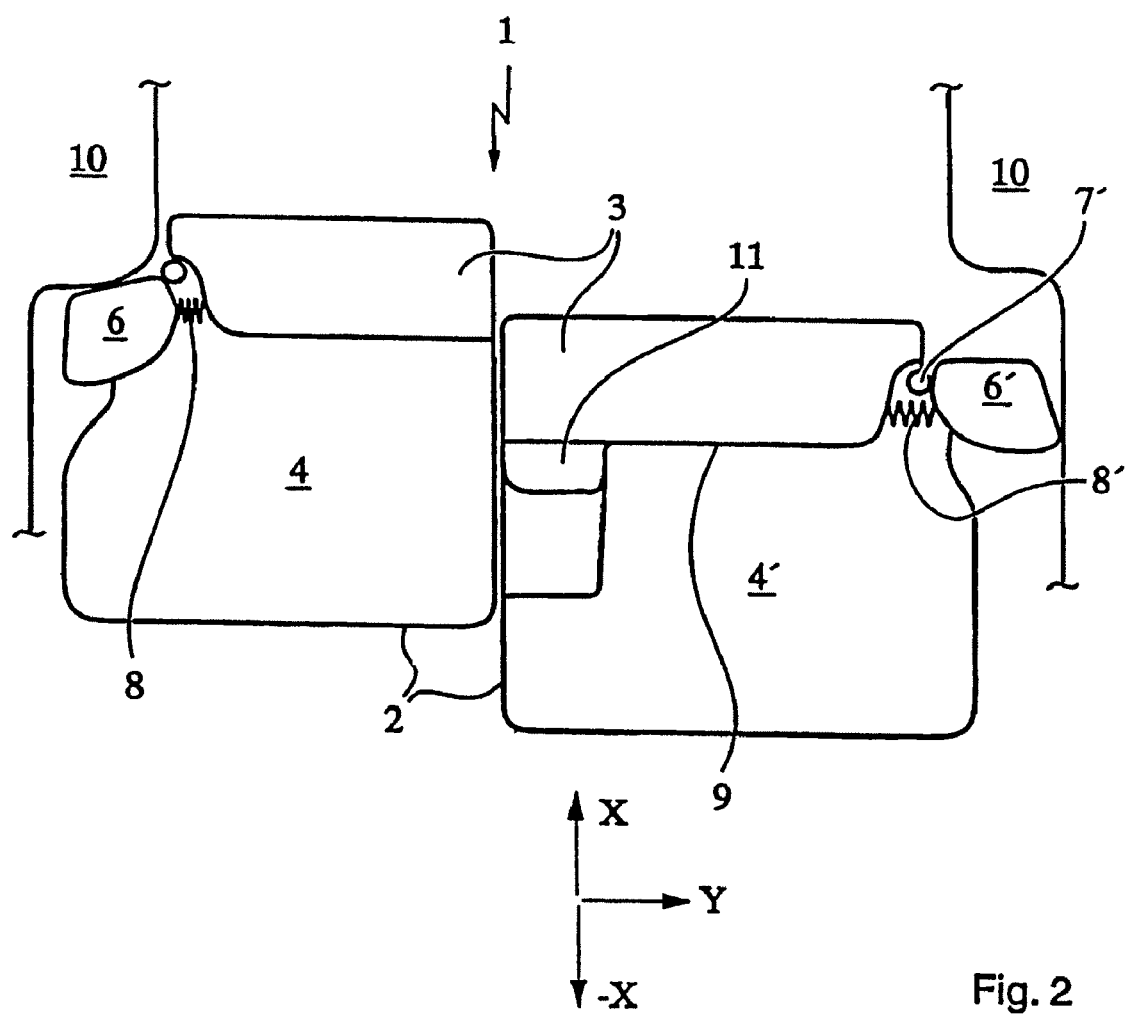
Figure 3:
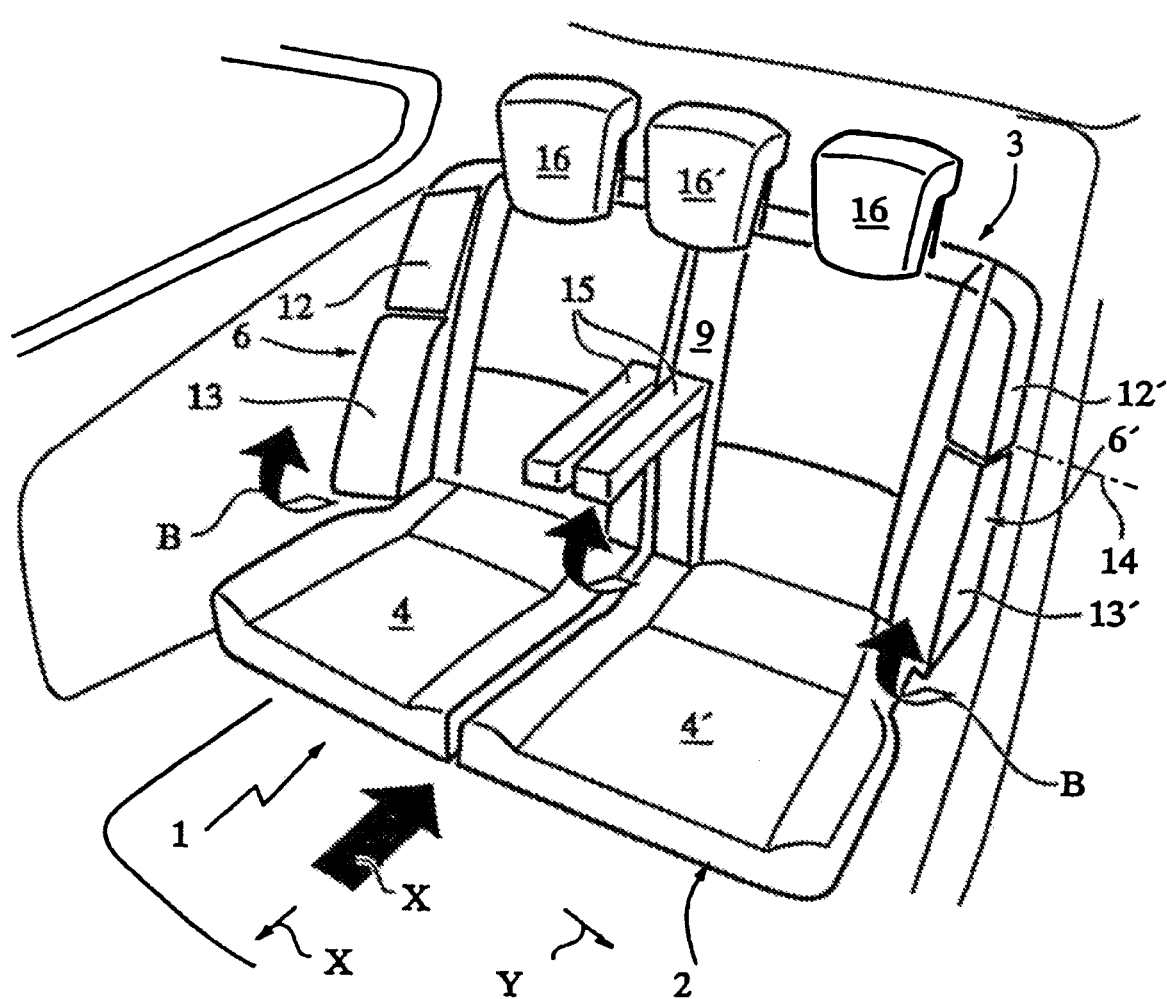

In the drawings:

FIG. 1 shows a first inventive, displaceable rear seat bench of a motor vehicle, FIG. 2 shows a section through the backrest of the rear seat bench according to FIG. 1, with the seat segments in different sliding positions, FIG. 3 shows a displaceable rear seat bench according to another embodiment of the invention.

The rear seat bench 1 according to FIG. 1 comprises a seat part 2 and a backrest 3 affixed thereto and is asymmetrically divided in a transverse direction (Y-direction of the vehicle) into two segments 4, 4', which are independently anchored in the vehicle body so that they are displaceable in or counter to the direction of travel (−X or X-direction of the vehicle. On its outside, that is to say on the areas of the segments 4, 4' facing the vehicle body side walls 5, the backrest 3 has swiveling side cushions 6, 6', which are rotatable about a vertical axis 7 of the backrest 3 in the direction of the arrow A. The vertical axis 7, 7' extends approximately vertically when the backrest 3 is in the upright position of use. This does not preclude a facility for folding the actual backrest 3 into some other position, in order to increase the load capacity of the trunk, for example.

As can be seen from the section according to FIG. 2, the side cushion 6' of the segment 4' is held back by a spring 8' about the vertical axis 7' in a position in which it runs approximately flush with the support face 9 of the backrest 3. If the rear seat bench is shifted in the X-direction from a forward sliding position (segment 4') into a rear sliding position (segment 4), the associated side cushion 6 strikes the wheel arch 10 of the vehicle body (or other actuators arranged there), and is positively swiveled forward about the vertical axis 7 under the compression of the spring 8. The position of the seat occupants is thereby shifted in the transverse direction (Y-direction) towards the middle of the vehicle.

If the rear seat bench as a whole is located in a forward sliding position, it can accommodate three occupants. After sliding both segments 4, 4' back, on the other hand, there is only space available for two persons, who will nevertheless enjoy a more comfortably contoured backrest 3. The contour is supplemented by a middle cushion 11 that folds out of the seat part 2.

In the case of the rear seat bench according to FIG. 3, the side cushions 6, 6' are each divided into an upper, rigid part 12, 12' and lower, rotating part 13, 13'. The lower parts 13, 13' are capable of swiveling about a transverse axis 14 of the backrest 3 and under the action of a spring (not shown) are held in a rear plane running flush with the support face of the backrest 3 when the rear seat bench 1 is pushed forward. When the rear seat bench 1 is pushed back, the lower parts 13, 13' strike the wheel arches 10 or other actuators fixed to the vehicle body and are thereby shifted forwards (arrows B). This also serves to adjust the seating position in the desired way. Armrests 15 folding out of the center of the backrest complete the comfort afforded.

The head restraints 16, 16' of the rear seat benches according to FIGS. 1 to 3 are so wide that they afford protection for the relevant number of occupants in all predefined seating positions, only the outer head restraints 16 serving for head support when the rear seat bench 1 is pushed back.

The side cushions 6, 6' need not necessarily be adjusted by the mechanical means described. Instead adjustment may be performed pneumatically, hydraulically or electrically through detection of the sliding position adjustment of the rear seat bench 1. It is likewise possible to combine the positive adjustments of the side cushions 6, 6' previously described with one another and for the parts 12, 13 and 12', 13' each to swivel about the vertical axes 7, 7' and for the lower parts 13, 13' again to swivel about the transverse axis 14.

LIST OF REFERENCE NUMERALS

1 rear seat bench
2 seat part
3 backrest
4, 4' segment
5 vehicle body wall
6, 6' side cushion
7, 7' vertical axis
8, 8' spring
9 support face
10 wheel arch
11 middle cushion
12 upper part (of the side cushion)
13 lower part (of the side cushion)
14 transverse axis
15 arm rests
16, 16' head restraint

The invention claimed is:

1. A vehicle seat for a motor vehicle, comprising:
    a seat part; and
    a backrest, which is provided with displaceable side cushions, the positions of which can be varied as a function of a sliding position of the backrest,
    wherein at least the backrest is arranged in the vehicle so that the backrest is displaceable in a direction of travel of the vehicle and counter to the direction of travel, and the positions of the side cushions located on an outside of the backrest can be positively varied as a function of the sliding position of the backrest.

2. The vehicle seat as claimed in claim 1, wherein the seat part is displaceable together with the backrest.

3. The vehicle seat as claimed in claim 1, wherein the vehicle seat is a seat bench divided in a transverse direction, outer segments of the seat bench being provided with the displaceable side cushions on outer sides of the outer segments.

4. The vehicle seat as claimed in claim 1, wherein each side cushion is capable of swiveling about a vertical axis of the backrest.

5. The vehicle seat as claimed in claim 1, wherein at least a lower part of each side cushion is rotatable about a transverse axis of the backrest.

6. The vehicle seat as claimed in claim 5, wherein when the backrest is in a forward sliding position, the side cushions are swiveled into positions running in a plane of a support face for backs of seat occupants.

7. The vehicle seat as claimed in claim 6, wherein the side cushions are swiveled into rear positions under an action of a spring.

8. The vehicle seat as claimed in claim 6, wherein when the backrest is in a rear sliding position, the side cushions are swiveled into forward positions, wherein the side cushions project forward from the support face.

9. The vehicle seat as claimed in claim 8, wherein the side cushions are swiveled into the forward positions due to contact with an actuator fixed to a vehicle body.

10. The vehicle seat as claimed in claim 9, wherein the side cushions are swiveled into the forward positions due to contact with wheel arches of the vehicle body.

* * * * *